US 6,685,269 B1

(12) United States Patent
Freijy et al.

(10) Patent No.: US 6,685,269 B1
(45) Date of Patent: Feb. 3, 2004

(54) VEHICLE SEAT ASSEMBLY

(75) Inventors: Nizar Freijy, Lake Orion, MI (US); Robert John Dowell, Rochester, MI (US); Paul Cameron Babcock, Bloomfield Hills, MI (US); Dennis John Varga, Waterford, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/105,090

(22) Filed: Mar. 22, 2002

(51) Int. Cl.[7] .................... A47C 1/02; A47C 15/00; B60N 2/02
(52) U.S. Cl. .................. 297/332; 297/334; 297/335; 297/336; 297/337; 297/353; 297/378.12; 297/257
(58) Field of Search ................... 297/332, 334, 297/336, 378.12, 257, 353, 337; 296/65.05, 65.11, 65.13, 65.16

(56) References Cited

U.S. PATENT DOCUMENTS

| | | | |
|---|---|---|---|
| 3,054,641 A | | 9/1962 | Smith |
| 4,194,782 A | | 3/1980 | Itoh |
| 4,609,221 A | | 9/1986 | Böttcher |
| 4,793,649 A | | 12/1988 | Yamano et al. |
| 4,925,227 A | * | 5/1990 | Bateman .................. 296/65.05 |
| 5,474,353 A | | 12/1995 | Koester et al. |
| 5,482,349 A | | 1/1996 | Richter et al. |
| 5,707,103 A | | 1/1998 | Balk |
| 5,951,084 A | | 9/1999 | Okazaki et al. |
| 6,070,939 A | * | 6/2000 | Matsuo et al. ......... 297/378.12 |
| 6,135,555 A | | 10/2000 | Liu et al. |
| 6,155,639 A | * | 12/2000 | Frolo ........................ 297/331 |
| 6,158,800 A | * | 12/2000 | Tsuge et al. ............. 296/65.09 |
| 6,170,913 B1 | * | 1/2001 | Seibold et al. ............... 297/335 |
| 6,183,033 B1 | * | 2/2001 | Arai et al. ................ 296/65.09 |
| 6,199,931 B1 | | 3/2001 | Shaw |
| 6,224,132 B1 | | 5/2001 | Neale |
| 6,244,645 B1 | | 6/2001 | Baumert et al. |
| 6,347,834 B1 | * | 2/2002 | Couasnon .................... 297/341 |
| 2002/0017797 A1 | * | 2/2002 | Jach et al. ................ 296/65.09 |

FOREIGN PATENT DOCUMENTS

GB       2095984 A   * 10/1982   .......... B60N/01/06

* cited by examiner

Primary Examiner—Peter M. Cuomo
Assistant Examiner—Sarah C. Burnham
(74) Attorney, Agent, or Firm—Bill C. Panagos

(57) ABSTRACT

A seat assembly for a vehicle that has a rear seat positioned behind the seat assembly. The seat assembly includes a seat bottom that is movable between a seating position and a forward position. In the seating position, the seat bottom is in a generally horizontal position for supporting an occupant seated on the seat assembly. In the forward position the seat bottom is in a generally vertical position such that a rear edge of the seat bottom is positioned above a front edge of said seat bottom. The seat assembly also has a seat back that is movable between a seating position and a second position. In the seating position the seat back is in a generally lateral position relative to the vehicle for supporting an occupant seated on said seat assembly. In the second position the seat back extends longitudinally relative to the vehicle to permit access to a rear seat positioned behind said seat assembly.

20 Claims, 8 Drawing Sheets

VEHICLE SEAT ASSEMBLY

BACKGROUND OF THE INVENTION

The present invention relates to a moveable seat assembly for a vehicle and more particularly to a moveable seat assembly that can be moved to allow easy access to a third row seat or a cargo storage area.

It is becoming increasingly more common in passenger vehicles, such as sport utility vehicles and mini-vans, to include a third row seat or seats. Commonly, the vehicle includes a pair of front doors and a pair of rear doors located adjacent the front and second row of seats, respectively. The third row seat typically is a single bench seat extending across the width of the vehicle. The third row seat is commonly located at the generally furthermost rear portion of the vehicle and is not located adjacent a door opening. Thus, passengers do not have direct access to the third row seat.

To provide access to the third row seat or a rear storage area, it is known to have one or more of the second row seat assemblies movable to a forwardly folded position adjacent the front row of seats, such as disclosed in U.S. Pat. No. 6,135,555. The second row seat assembly is folded such that the seat back is first folded downwardly on top of the seat bottom, and then both are pivoted about a pivot point at a lower front edge of the seat bottom to approximately 90 degrees. The seat back of the second row seat assembly will then be positioned between the seat bottom and the seat back of the front row seat. The passenger can then enter the vehicle via one of the rear doors, and slip past the folded second row seat assembly, thereby permitting access to the third row seat. However, movement of such a second row seat is often difficult and cumbersome. Additionally, the area of ingress and egress through the rear door opening is often uncomfortably small for a typical vehicle occupant to transit because of the positioning of the folded second row seat assembly.

Therefore, it would be advantageous to provide a vehicle seat assembly that allows a user to more easily gain access to a third-row seat or easier access to the rear cargo area.

SUMMARY OF THE INVENTION

This invention relates to a seat assembly for a vehicle that has a rear seat positioned behind the seat assembly. The seat assembly includes a seat bottom that is movable between a seating position and a forward position. In the seating position, the seat bottom is in a generally horizontal position for supporting an occupant seated on the seat assembly. In the forward position the seat bottom is in a generally vertical position such that a rear edge of the seat bottom is positioned above a front edge of said seat bottom. The seat assembly also has a seat back that is movable between a seating position and a second position. In the seating position the seat back is in a generally lateral position relative to the vehicle for supporting an occupant seated on said seat assembly. In the second position the seat back extends longitudinally relative to the vehicle to permit access to a rear seat positioned behind said seat assembly.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
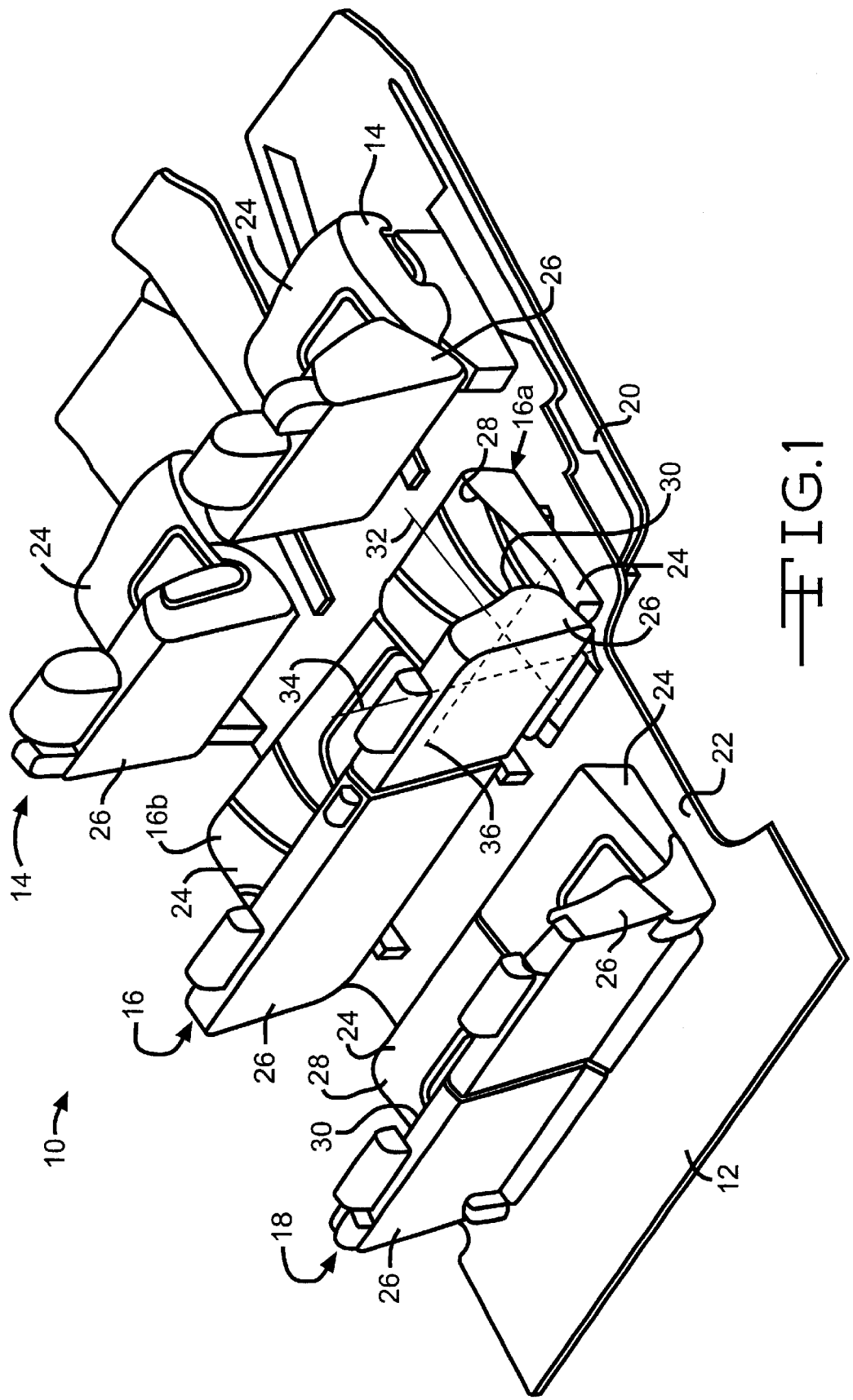
FIG. 1 is a perspective view of a portion of a vehicle interior having multiple rows of seats with all of the seats in an upright seating position.
Figure 5:
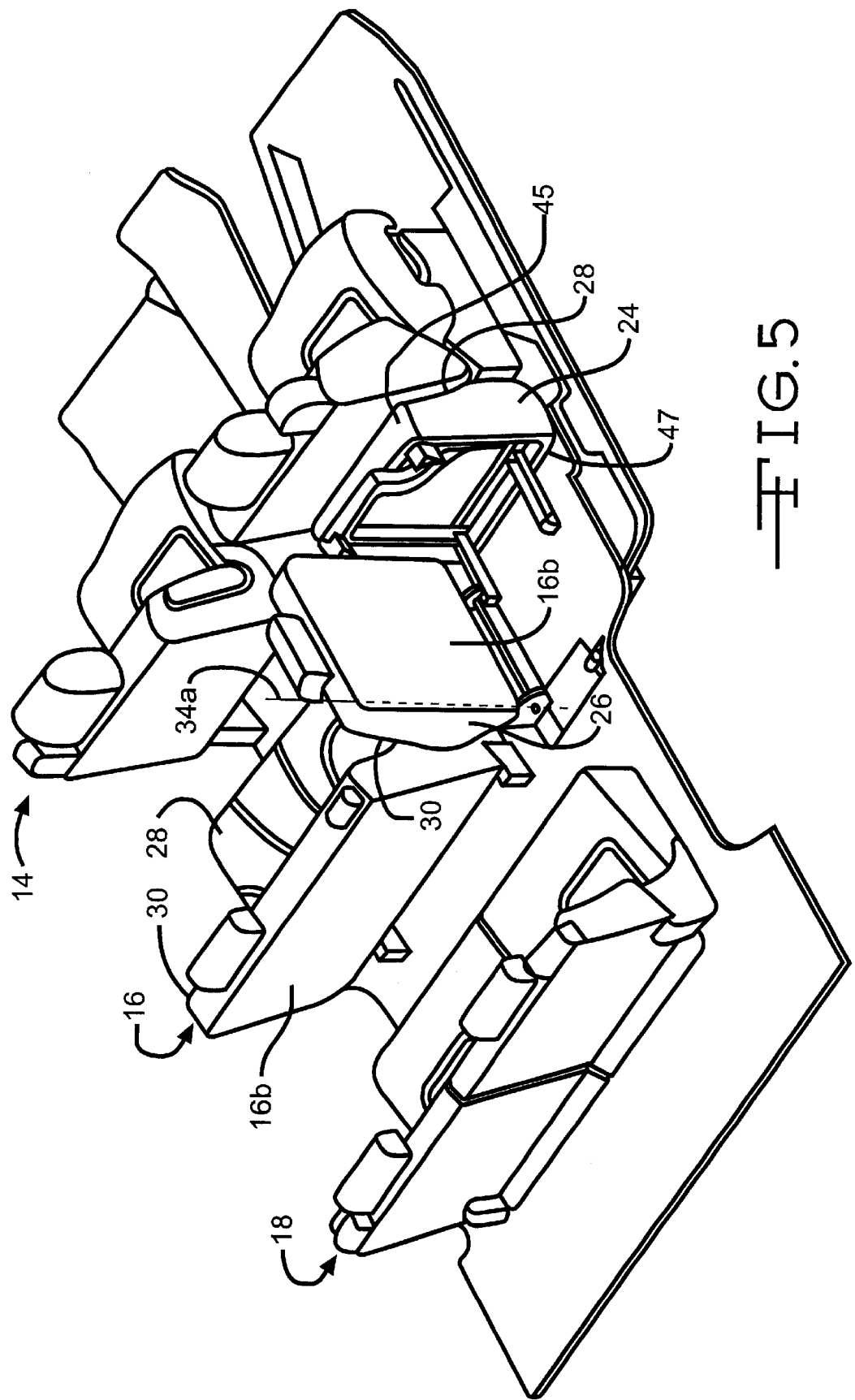
FIG. 5 is a perspective view of a portion of a vehicle interior with one of the seats in an easy entry position.

Referring now to the drawings, there is illustrated in FIG. 1 a portion of a vehicle interior 10. Specifically, illustrated is a vehicle floor 12 with a plurality of vehicle seats 14, 16, 18 located thereon. The method of attaching the vehicle seats 14, 16, 18 to the floor 12 will be described in greater detail below. FIG. 1 shows the vehicle interior with single occupant seats or "captain chairs" 14 defining a first row, seats 16 defining a second row, and seats 18 defining a third row. Although "captain chairs" 14 are illustrated as being used in the first row, it is understood that any other type of seat design can be used with a vehicle implementing this invention. Also, the second row seat 16 is illustrated as being a 60/40 type seat having two distinct portions 16a and 16b. A 60/40 seat is typically considered to include two portions with one seating portion or seat 16b encompassing about 60 percent of the overall width of the seat 16 and the second portion or seat 16a encompassing about 40 percent of the overall seat width. As will be described below, the seat 16a is movable to an easy entry position, as shown in FIG. 5, to permit access to the third row of seats 18. It should be understood that the seats 14, 16, 18 can have any configuration.

All of the seats 14, 16, and 18 generally include a seat bottom 24 and a seat back 26 for supporting an occupant. The seats 16, 18 are shown in a seating position with the seat bottoms 24 in a generally horizontal seating position and the seat backs 26 in an upright, generally vertical position. The use and function of the seats 14, 16, 18 will be described in greater detail below.

The vehicle floor 12 is shown in FIGS. 1 through 5 as having a stepped profile having multiple height levels. In particular, the first row and second row of seats 14 and 16 are supported on a first level 20. The third row of seats 18 are on a second level 22 that is higher than the first level 20. However, due to the structure of the seat supports below the seat bottoms 24, the seating surfaces may be essentially on the same level. Although two levels 20, 22 are shown in the Figures, it should be understood that the vehicle floor 12 can have any number of levels. Additionally, each row of seats 14, 16, 18 can be supported on a single level or on different levels. The illustrated vehicle interior is generally designed for use with a sport-utility vehicle (SUV) or minivan type vehicle. However, it is understood that the invention can also be used with a truck, station wagon or any other type of vehicle. Particularly, the invention can be used with a vehicle in which easy access to second 16 and third row 18 seats is necessary, or vehicles in which increased storage capacity is needed.

Figure 2:
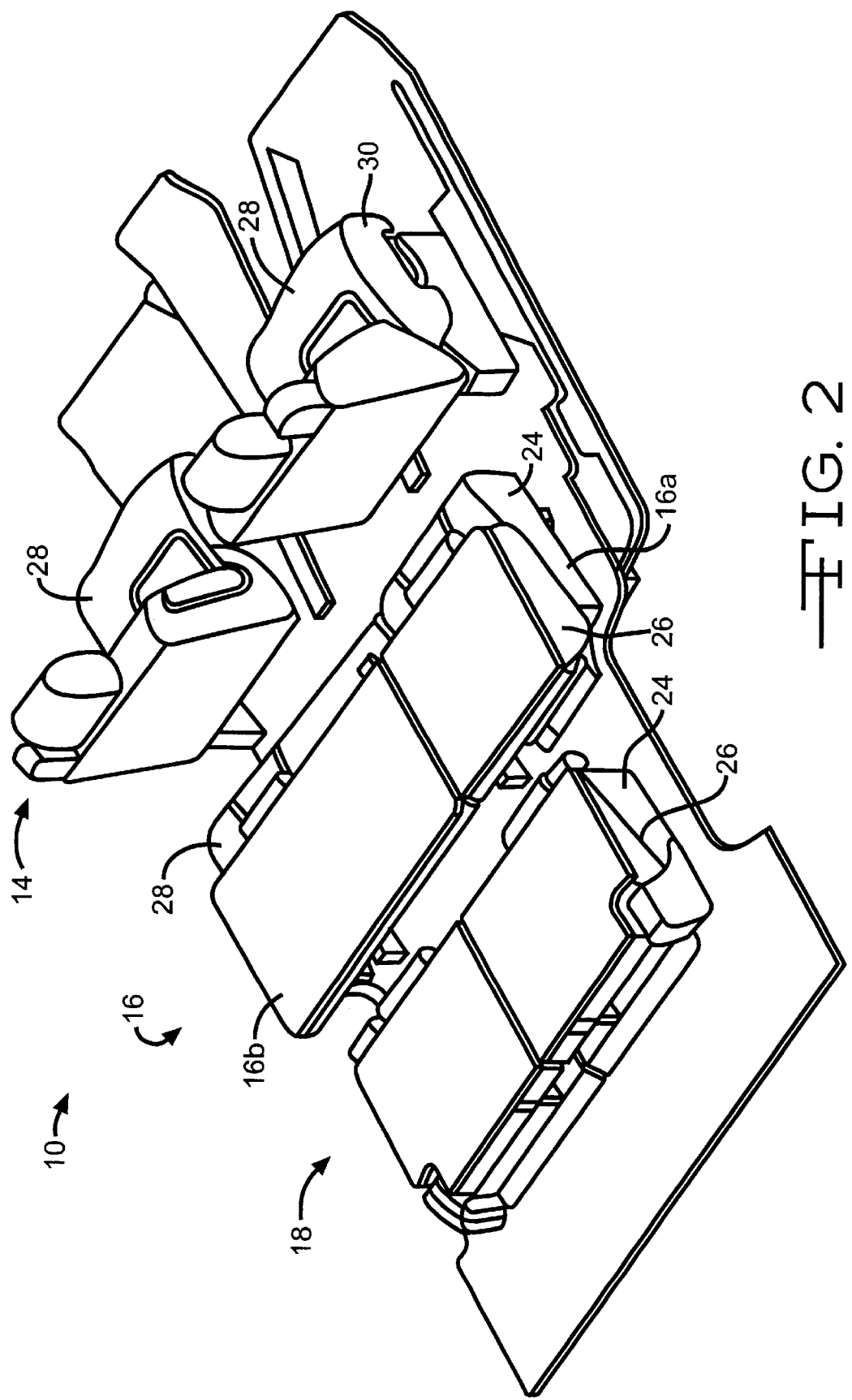
FIG. 2 is a perspective view of the vehicle interior shown in FIG. 1 with second and third row seats in a folded position.

Illustrated in FIG. 2 is the vehicle interior of FIG. 1 with the seat back 26 of the second and third row seats 16 and 18 in a folded position. With the seats in a folded position a vehicle can have a larger cargo capacity. Additionally, items for transport can be placed in the vehicle interior with greater ease. To be moved into a folded position, each seat back 26 is folded from a generally vertical position over its respective seat bottom 24 with the seat bottom 24 remaining in a seating position (generally horizontal). It should be understood that when referring to the orientation, movement or position of the seat bottom and seat back as used herein, the terms "horizontal", "vertical", "lateral", and "longitudinal" are general terms used to approximate their orientation relative to the horizon or floor of the vehicle. More particularly, the terms "horizontal" and "vertical" are used to approximate an axis defined by seating surfaces 28 and 30 of the seat bottom and seat back. The seating surfaces are portions of the seat which are in usual contact with the occupant seating on the seat. Thus, the upper surface of the seat bottom 24, as shown in FIG. 1, defines the seating surface 28. The frontal surface of the seat back 26, as shown in FIG. 1, defines the seating surface 30. Although the seating surfaces 28 and 30 can have any suitable contoured shape for comfort of the seat occupant, an axis can be approximated representing a relatively linear axis. As shown in FIG. 1, with respect to the seat 16a, the seating surface 28 of the seat bottom 24 defines an axis 32 which is approximately or generally in a horizontal position. Of course, the axis 32 can be skewed or offset by any suitable amount, such as within a range of about 0 to 30 degrees. Similarly, the seating surface 30 of the seat back 26 defines an axis, shown mainly by hidden lines 34. The seating surface 30 is approximately or generally in a vertical position. Naturally, the axis 34 is skewed or offset to accommodate the comfort and support of the back of the seat occupant. Thus, the axis 34 can be skewed or offset by any suitable amount, such as within a range of about 5 to about 45 degrees. The seat back 26 also defines an axis, shown by hidden lines 36, generally perpendicular to the axis 32 which generally extends in a horizontal direction. The axis 36 generally defines a lateral or longitudinal position of the seat back 26, as shown and described herein.

Additionally, although the seating surface 28 of the seat bottom 24 has been described as being generally horizontal, and the seating surface 30 of the seat back 26 being generally vertical, it should be understood that the seating surface 28 of the seat bottom or the seating surface 30 of the seat back 26 can also be contoured. Further, the shape of the seating surfaces 28 and 30 can be contoured such that there is no surface that is exactly horizontal or vertical. Alternatively, the seating surface 28 of the seat bottom 24 can have both a contoured portion and a horizontal surface portion. Also, the seat back seating surface 30 can have both a contoured portion and a vertical surface portion.

Figure 6:
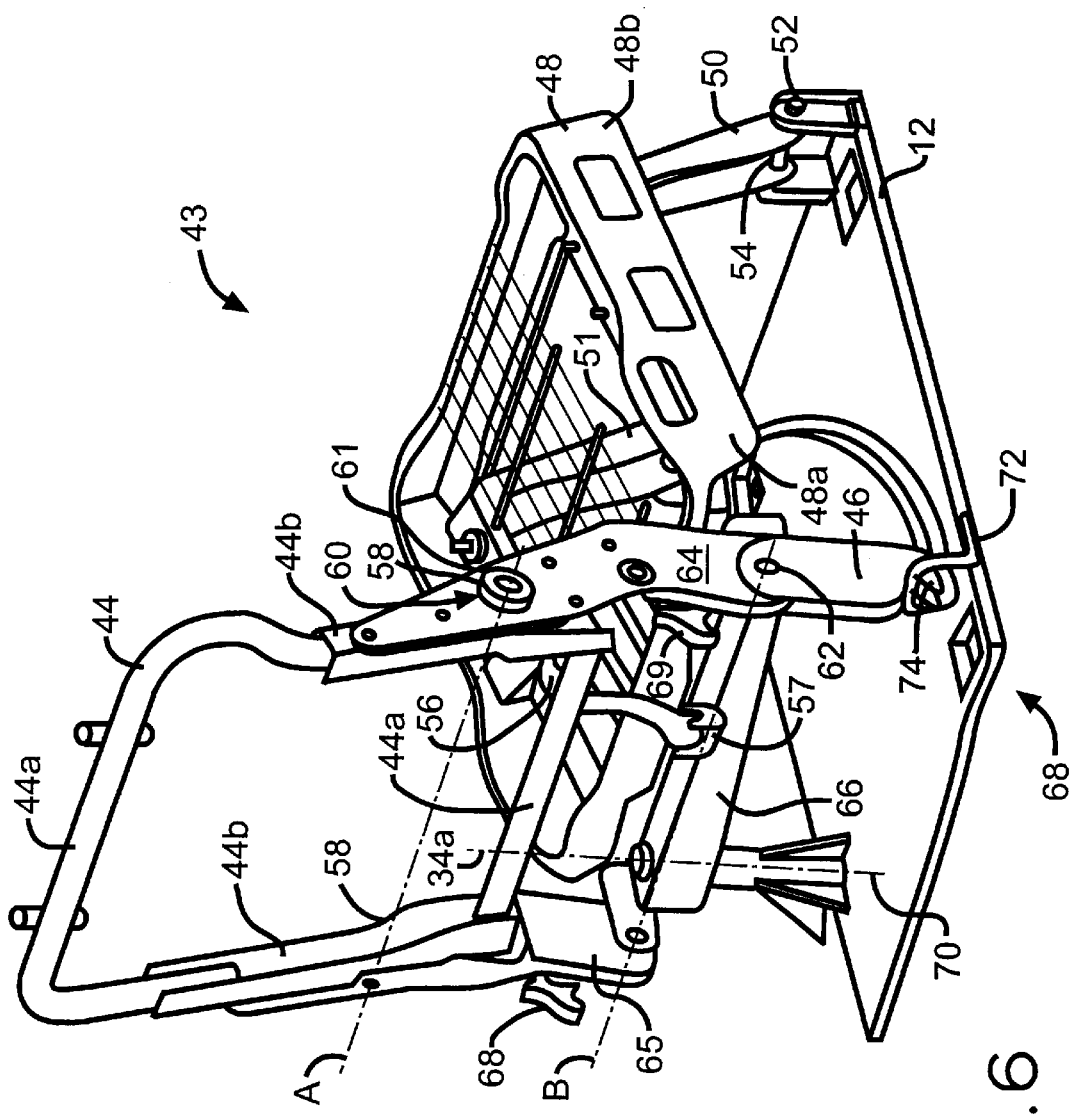
FIG. 6 is a perspective view of a frame assembly for a vehicle seat in accordance with the present invention, wherein the frame assembly is in the seating position.
Figure 8:
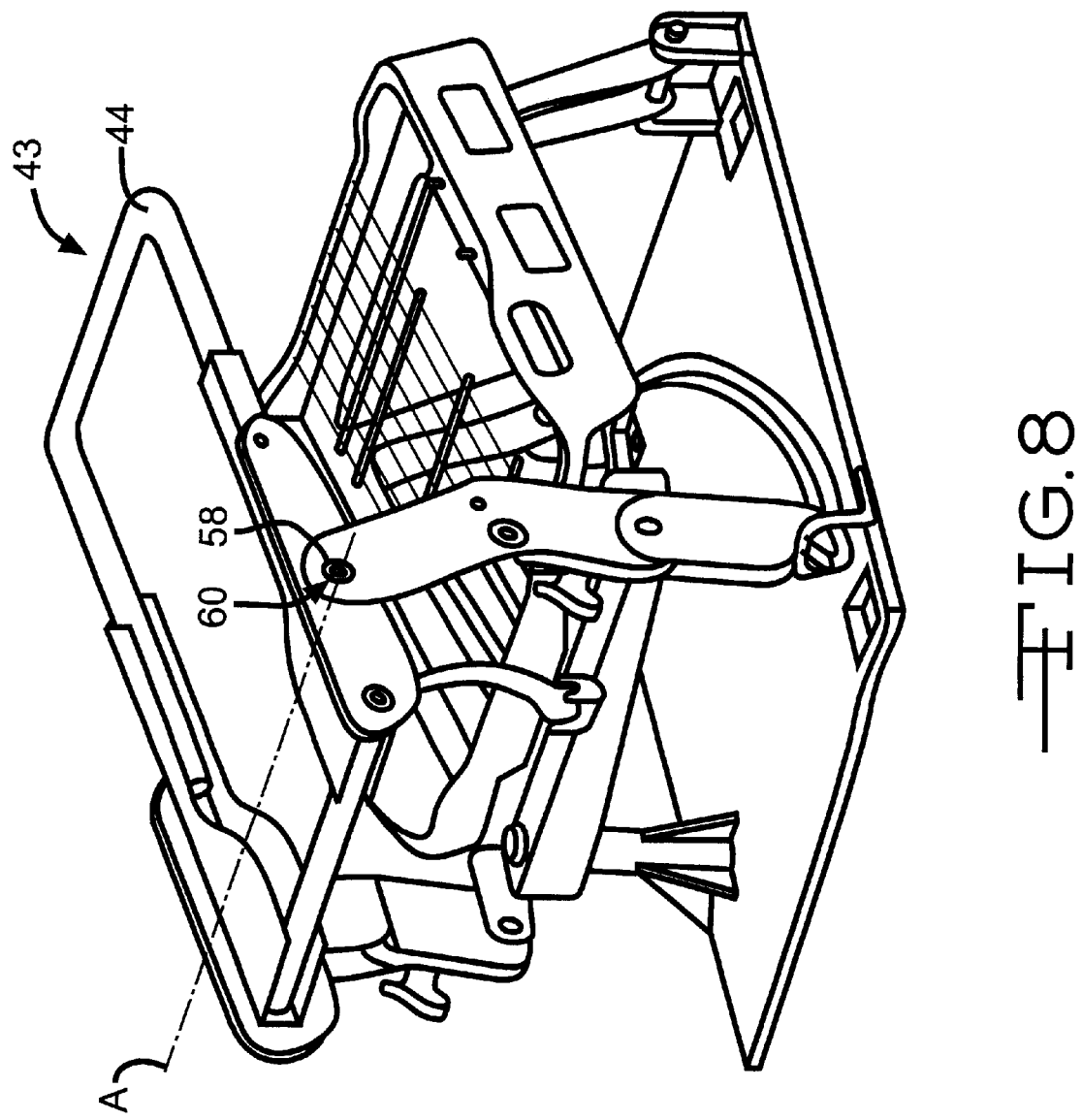
FIG. 8 is a perspective view of the vehicle seat shown in FIG. 6 with the seat in a folded position.

To more easily fold the seat back 26 of the seats 16 and 18 to its folded position, it is preferred that the seat back 26 pivots about an upper pivot axis A at a pivot 58, shown in FIG. 6. The first seat back pivot 58 is preferably positioned slightly higher than the seat bottom seating surface 28. This allows the seat back 26 to be folded over the seat bottom 24 and into a generally horizontal position with the seating surface 30 of the seat back 26 adjacent the seating surface 28 of the seat bottom 24. If the first pivot 58 is too high or too low and the seat back 26 is moved into a folded position, the seat back 26 would move beyond a horizontal position or not attain a horizontal position, respectively. A detailed illustration of the frame assembly of the folded seat back 26 is shown in FIG. 8. Although the front "captain chair" seats 14 are not illustrated in a folded position, it should be understood that either or both first row seats 14 could be similarly moved into a folded position. It is preferred that when the seat backs 26 are in a folded position, each seat back 26 is generally co-planar with the other folded seat backs 26 to form a relative flat load floor. Having generally co-planar folded seat backs 26 increases the ease of placement of items on the back of the seat backs 26 for storage and/or transport. The mechanism for moving a seat back 26 into a folded position will be described in greater detail below.

Figure 3:
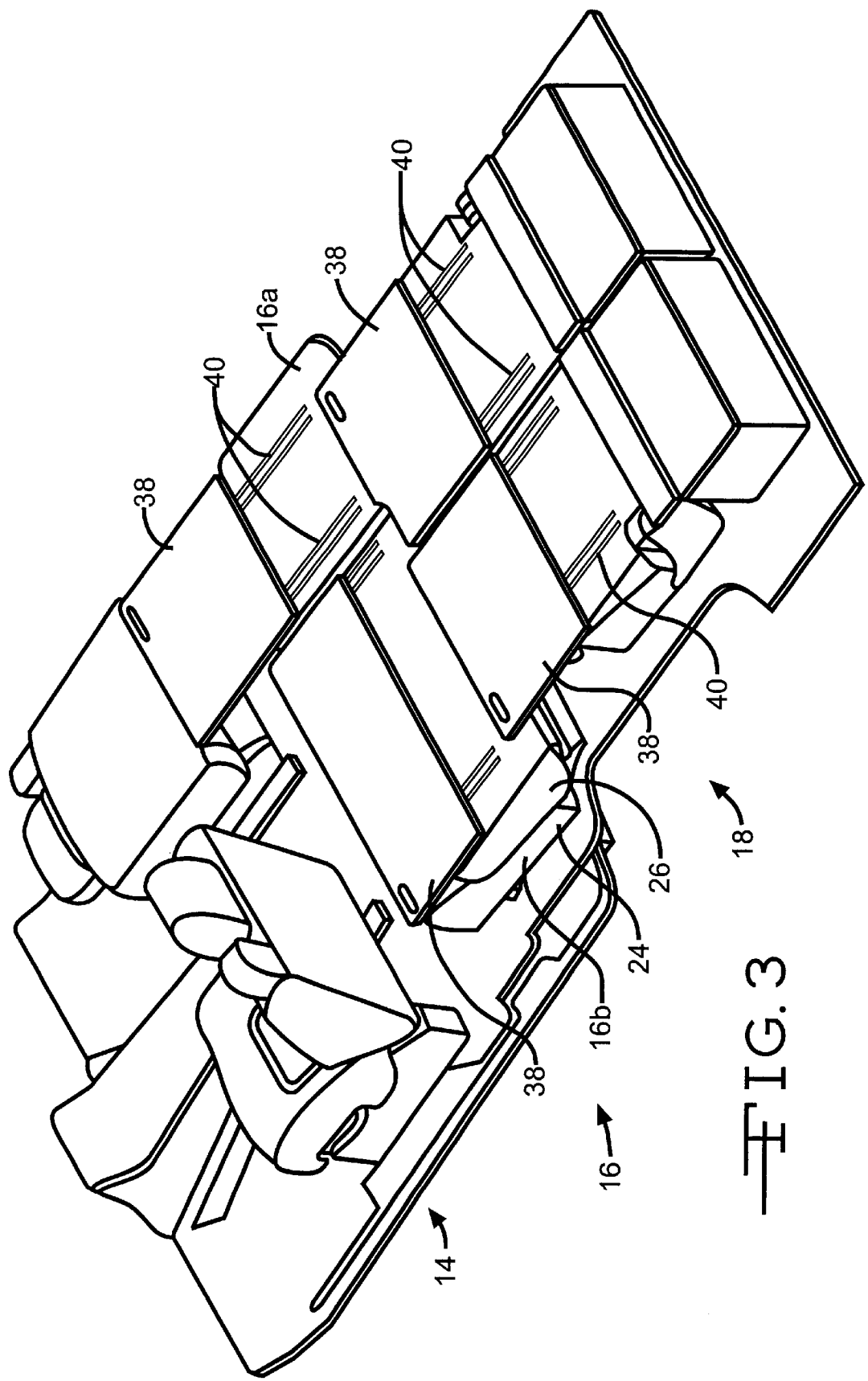
FIG. 3 is a perspective view of the vehicle interior shown in FIGS. 1 and 2 with the front passenger seat in a folded position and with the folded rear seats having support panels extending therefrom.

Illustrated in FIG. 3 is the vehicle interior shown in FIG. 2 depicting the passenger "captain chair" 14 as well as the second and third row seats 16 and 18 in a folded position. Extending from the rear side of each of the seat backs 26 are relatively flat support panels 38. The support panels 38 can be made of plastic, metal, sturdy cardboard or any other suitable material. The support panels 38 preferably extend from each seat back 26 and can retract therein such that the panels 38 can be positioned out of view when not in use. It is preferred that the panels 38 have a mechanism (not shown) for engaging tracks 40 formed in each seat back such that the mechanism slides along the tracks when moved into a use position. There can also optionally be a pocket (not shown) formed on a seat back 26 to conceal a support panel 38 and tracks 40. Alternatively, the support panels 38 can be visible, and also form the outermost rearward portion of the seat back 26 when in a retracted position. In an alternate embodiment, instead of sliding from the seat back 26, a support panel 38 can be connected by a hinge mechanism (not shown) at or near the top of the seat back 26 such that the panel 38 folds open when moved into a use position. In either embodiment, a locking mechanism (not shown) may be used that prevents the panel 38 from moving when in use or when not being used. Optionally, each panel 38 can be configured such that it can only be extended when a seat back 26 is in a folded or a storage position (which will be described in detail below). While extended, the support panels 38 bridge the gap between the seat backs and provide a generally flat continuous load floor for supporting cargo in the vehicle. The support panels 38 reduce or eliminate the gaps between the top of a folded seat back 26 the area in front of it so that smaller items can be positioned thereon without falling into the gaps between seats 14, 16 and 18.

Figure 4:
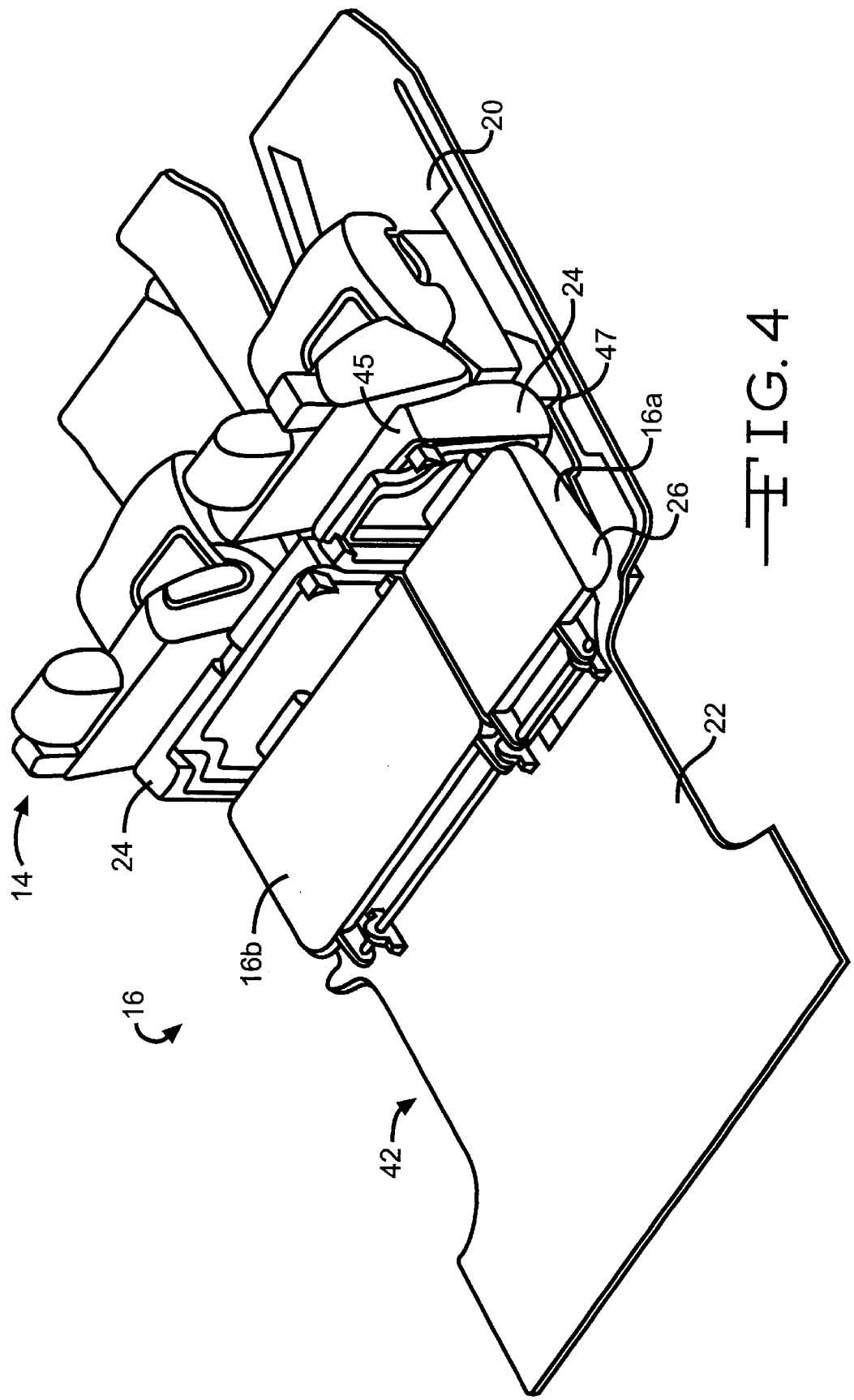
FIG. 4 is a perspective view of a portion of a vehicle interior with the second row seats in a storage position.

Now referring to FIG. 4, is the vehicle interior of FIG. 1 with the third row seats 18 removed. Alternatively, the illustrated vehicle could be supplied with no third row seat such that the area behind the second row seat is a generally flat, open area 42 that can be used for cargo space. As shown in FIG. 4, the second row seat 16 is in a storage position. For the seat 16 to be moved into a storage position, the seat bottom 24 is first moved into a forward position, as shown in FIG. 4. In a forward position, the seating surface 28 of the seat bottom 24 is moved into a generally vertical position with a rear edge 45 of the seat bottom 24 positioned above a front edge 47 of the seat bottom 24. With the seat bottom 24 moved away from its respective seat back 26, the seat back 26 can be moved into a lower position than the folded position described above. To accomplish this, the seat back 26 preferably has a second seat back pivot 62 pivotable about pivot axis B that is lower than the first seat back pivot 58 and axis A. With a lower second pivot 62, the seat back 26 can fold at a lower point thereby allowing the folded position of the seat back 26 to also be lower. Pivoting about the second pivot 62, the seat back 26 is folded into a generally horizontal position and a rear side 49 thereof is generally co-planar with the second level 22 of the vehicle floor 12. Thus, the rear side 49 of the seat back 26 and the second level 22 of the floor 12 form a continuous flat load floor. In such a position, the cargo space of the vehicle is increased. Additionally, with the cargo area being generally level, it is easier for an individual to use the cargo area.

Illustrated in FIG. 5 is the interior of a vehicle including the first, second and third row of seats 14, 16, and 18. In order to increase the transit area which a person entering or exiting the vehicle can use to access the third row seat 18 or cargo area 42, the seat 16a (closest to the entry point of the vehicle) is movable to an easy entry position, as shown in FIG. 5. In an easy entry position, the seat bottom 24 is first moved into a folded position that is generally vertical, as was described above with respect to the storage position of the seat 16, 18. Once the seat bottom 24 has been moved, the seat back 26 can be moved into the easy entry position. As will be described in greater detail below (See also FIG. 6 and 7), the seat back 26 of the seat 16a is pivoted about an axis 34a from a generally lateral position, as shown in FIG. 1, to a generally longitudinal position, as shown in FIG. 5. During this movement, the seat back 26 remains in a generally vertical position and is rotated approximately 90 degrees on the vertical axis 34 from its original lateral position. If desired, the seat back 26 can be locked such that the seat back remains at the easy entry position and can be grasped and pulled by the passenger while maneuvering around the seat 16a. Instead of locking the seat back 26 in its easy entry position, the seat back can have a detent mechanism which maintains the seat back 26 in the position until a predetermined force input releases the seat from the detent mechanism and the seat back can them be moved. Upon completing ingress or egress, the seat back 26 can be returned to its starting position by rotating the seat back 26 about the axis 34. It should be understood the axis of rotation 34 can be positioned at the inboard side of the seat back, the outboard side of the seat back, or at any point therebetween. It is preferred that the axis 34 be positioned closer to the inboard side of a seat 16, 18 than the outboard side. This will increase the open space (transit) area for easy entry when the seat back 26 is pivoted about the axis 34.

It is also desirable for the seat 16a to include a recliner mechanism for adjusting the angle of the seat back 26 relative to the seat bottom for comfort of the occupant. To prevent interference of the position of the seat back prior to movement into the easy entry position, the seat 16 is preferably configured such that the recliner mechanism is adapted to first move the seat back 26 to a predetermined upright position (generally vertical orientation) when the seat 16 is operated as described below, and then permit the seat back to rotate about the axis 34a to its easy entry position.

There is illustrated in FIG. 6 an embodiment of a frame assembly 43 or structure for the seat 16a as described above. The frame assembly of the seat 16a is shown in a seating position in FIG. 6. The assembly 43 generally has an upper frame member 44, a lower frame member 46, and a seat bottom frame member 48.

The seat bottom frame 48 can have a generally rectangular shape and is preferably adapted to support a seat cushion (not shown in FIG. 6), designed to cover the seat bottom frame member 48. The seat bottom frame 48 is supported at a rear edge 48a by the lower frame member 46 and at a front edge 48b by a leg 50. The seat bottom frame member 48 has at least one leg 50 and preferably two legs 50, 51 positioned at or near the front edge of the seat bottom frame 48. The legs 50, 51 are preferably pivotably connected to the vehicle floor 12. Specifically, it is preferred that the legs 50, 51 include a pivot member 52 attached to the vehicle floor 12. The pivot member 52 can further include a spring, shown schematically at 54. The spring 54 biases the seat bottom frame member 48 to its forward position when released. Thus, when in a seating position, the seat bottom frame 48 member has a locking mechanism 57 keeping it in a generally horizontal position, as shown in FIG. 6. The locking mechanism 57 can include a retractable hook and clasp assembly, a button and snap, or any other suitable mechanism. The spring 54 can be positioned at either one or both of the pivot points 52 of the legs 50 and 51. At the rear edge 48a of the seat bottom frame 48, there is preferably a lifting device, such as a handle or strap 56, such that when the lifting device 56 is pulled, the seat bottom frame 48 releases the locking mechanism 57 from the seat back frame members so that the seat bottom frame 48 can be moved forward. Alternatively, there can be a release mechanism (not shown) located elsewhere on the assembly 43, such as the outboard side thereof, that causes the seat bottom frame 48 locking mechanism 57 to release the seat bottom frame 48. Once the seat bottom frame 48 is released, the spring 54 biases the seat bottom frame 48 into a forward position.

The seat back frame members 44, 46 are also preferably adapted to support a cushion (not shown in FIG. 6) designed to cover the seat back frame members 44, 46. The upper frame member 44 can have a generally rectangular shape having horizontal cross bars 44a, and vertically oriented cross bars 44b. The upper frame member 44 is pivotally connected to the lower frame member 46 at least at a first pivot point 58 through the axis A. It is preferred that there are a pair of first pivot points 58 about which the upper frame member is connected to the lower frame member. The pair of pivot points 58 are preferably located on opposite sides of the upper 44 and lower frame 46 members. A second release mechanism, indicated generally at 60, is preferably also connected to at least one of the first pivot point 58 such that upon actuating the second release mechanism 60, the upper frame member 44 is pivotably released from the lower frame member 46. Then, the upper seat back frame member 44 can be tilted forward about the first pivot point 58 through the axis A into a generally horizontal folded position, as is shown and described above with respect to FIGS. 2 and 3. A spring mechanism, indicated generally at 61, such as a wrap spring, preferably biases the upper frame member 44 to its folded position. Any of the spring mechanisms discussed herein can be any suitable spring device for accomplishing the desired bias. The release mechanism 60 may be operated by an operating lever 68, located at any suitable location for easy reach and access.

In the folded position, the upper seat back frame member 44 has been disengaged from a locked position by the second release mechanism 60. Once released, the upper frame member 44 can pivot about the first seat back pivot 58. There is optionally a mechanism for locking the upper seat back frame 44 in the folded position. Once the upper seat back frame 44 is returned to the upright position, the second release mechanism 58 re-engages the upper frame member 44. There can also be an engaging surface on the upper portions of the lower frame member arms 64, 65 such that the upper frame member 44 cannot be pivoted beyond the arms 64, 65 of the lower seat back frame member 46. Additionally, the engaging surfaces can also include releasable locking mechanisms so that when the second release mechanism 60 is actuated, the locking mechanisms on the arms 64, 65 allow the upper frame member 44 to be moved.

In a preferred embodiment, there is a second pivot point 62 through axis B on the lower frame member 46 about which the seat back frame 44 and 46 can be moved into the generally horizontal storage position as shown and described above with respect to FIG. 4. The second pivot point 62 is preferably located slightly lower than the level 22 of the vehicle floor 12. This allows the seat back to fold forward to its storage position and allow the back of the seat back 26 to be generally co-planar with the second level 22 of the vehicle floor 12. A release mechanism is preferably operated to allow the seat back to move between the seating and storage positions.

Figure 7:
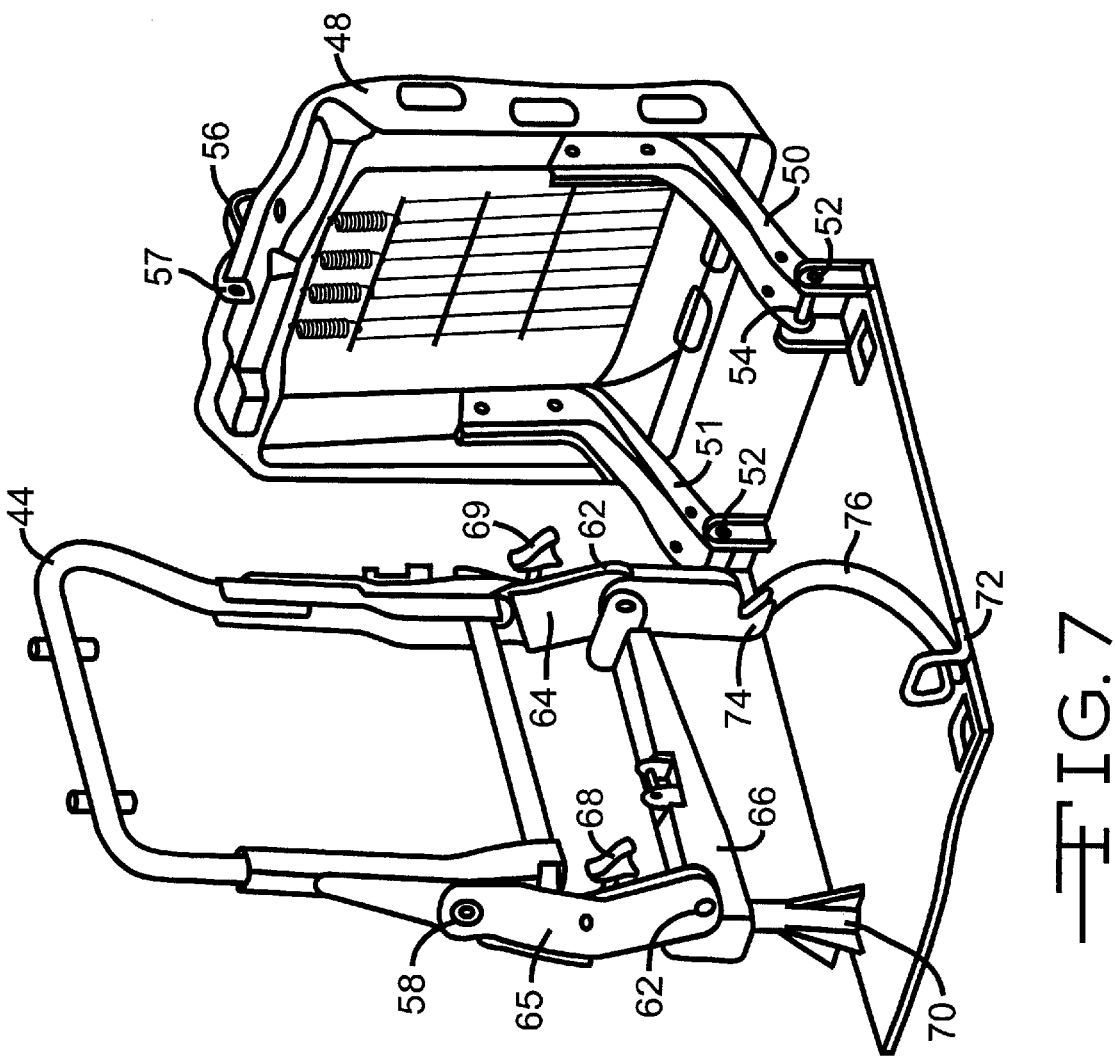
FIG. 7 is a perspective view of the frame assembly shown in FIG. 6 with the seat in an easy entry position.

Referring to FIGS. 6 and 7, the lower seat back frame member 46 includes first and second generally vertical arms 64 and 65 that are connected by a generally horizontal cross member 66. The first arm 64 and second arm 65 extend generally vertically and into engagement with the upper seat back frame member 44. The cross member 66 is supported at one end by a hinge pivot member 70 about a vertical axis 34a that is connected to the vehicle floor 12. Thus, the cross member 16 is pivotally mounted in a cantilevered manner on the pivot member 70. Alternatively, there can be a hinge pivot 70 at any axial position along the lower frame member 46 such that the frame member 36 pivots about that hinge 70. It is preferred that the hinge pivot member 70 be located distally opposed from the door opening (inboard side of the seat) through which a user is attempting to exit or enter the vehicle. This allows the seat back 26 to swing away from the door that is being used in order to provide the maximum space for the individual entering or exiting the vehicle. When in an easy entry position, the inboard (hinged) side of the seat back frame 46 may support most of the weight of the seat back frame members 44, 46 because of its cantilevered arrangement. Primarily, as illustrated, load support for the first arm 64 of the lower frame and the outboard side of the frame members 44, 46 are supported by the cross member 66 which is cantilevered on the hinge 70.

Illustrated in FIG. 7 is the frame assembly of the vehicle seat 16a of FIG. 6 in an easy entry position, as shown and described above with respect to FIG. 5. The seat bottom frame member 48 has been released and is in a generally vertical position. In this position, the legs 50, 51 of the seat bottom frame 48 have rotated about their respective pivot members 52. While in this position, the seat back frame members 44, 46 can be moved into the easy entry position without interference from the seat bottom frame 48. Located on at least one of the vertical arms 64, 65, or optionally on both arms 64, 65, is a third release mechanism, operated by a lever 69 (or any other suitable lever and lever location), for releasing the lower seat back frame member 46 from the vehicle floor 12. Upon activating the third release mechanism, the mechanism disengages a floor latch 72. The floor latch 72 is preferably attached to the vehicle floor 12 and is adapted to receive an engaging member 74. The engaging member 74 is connected to one arm 64 of the lower vehicle frame member 46 such that when the engaging member 74 is engaged, the lower vehicle frame member 46 is fixed relative to the vehicle floor 12. The other arm 65 of the lower frame member 46 is supported with the hinge member 70 as stated above. When the third release mechanism 68 releases the engaging member 74 from the floor latch 72, the seat back frame members 44, 46 can be moved on the hinge 70 into the easy entry position. There can optionally be a mechanism to lock the seat frame members 44, 46 into the easy entry position. Upon returning the seat back frame members 44, 46 to their original positions, the engaging member 74 re-engages the floor latch 72 so that the lower seat back frame member 46 is locked with the vehicle floor 12. Additionally, there can also be a track 76 that is formed in or extended upwardly from a portion of the vehicle floor 12. The lower vehicle frame member 46 can then have a track engaging member, such as a wheel, that either guides and/or is vertically supported by cooperating structures within the track 76. With the configuration shown in FIG. 7, the track 76 would be arcuate shaped about the vertical axis of the hinge member 70 and allow the frame member 46 to pivot about 90 degrees from its original position. It should be understood that the degree of pivot the frame member 46 can move can vary based on the configuration of the seats and the amount of space desired to be created for easy entry. Additionally, the frame member 46 can be pivoted in an amount that is less than the length of the track 76 as required by the user.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A seat assembly for a vehicle having a rear seat positioned behind said seat assembly, said seat assembly comprising:

a seat bottom movable between a seating position, wherein said seat bottom is in a generally horizontal position for supporting an occupant seated on said seat assembly, and a forward position, wherein said seat bottom is in a generally vertical position such that a rear edge of said seat bottom is positioned above a front edge of said seat bottom; and a seat back movable between a seating position, wherein said seat back is in a generally lateral position relative to the vehicle for supporting an occupant seated on said seat assembly, a second position, wherein said seat back extends longitudinally relative to the vehicle to permit access to a rear seat positioned behind said seat assembly, and a third position, wherein said seat back is in a generally horizontal position such that a rear side of said seat back faces upward, wherein said seat back is pivotable about a first horizontal axis to move said seat back to said third position, and wherein said seat back is also pivotable about a second horizontal axis to move said seat back to a fourth position such that said rear side of said seat back faces upward and is positioned higher than when said seat back is in said third position.

2. The seat assembly of claim 1, wherein said seat back has an inboard side and an outboard side, and wherein said seat back is pivotable about a generally vertical axis adjacent said inboard side to move said seat between said seating and second positions.

3. The seat assembly of claim 1, wherein said seat bottom and said seat back are movable independent of each other.

4. The seat assembly of claim 1 further including a spring mechanism biasing said seat bottom to said forward position.

5. The seat assembly of claim 1 further including a spring mechanism biasing said seat back to said third position.

6. The seat assembly of claim 1 wherein the seat back further comprises a main frame;

a lower frame pivotable relative to said main frame about the first horizontal axis; and an upper frame pivotable relative to said lower frame about the second horizontal axis.

7. The seat assembly of claim 2 wherein said outboard side of the seat back is adapted to slide in a track when the seat back is pivoted about said vertical axis.

8. The seat assembly of claim 1 further comprising a first release mechanism and a first spring wherein the first release mechanism releasably secures the seat bottom to the seating position, and the first spring biases the seat bottom into the forward position when the seat bottom is disengaged from the release mechanism; and a second, third and fourth release mechanism and a second, third and fourth spring, wherein the second, third and fourth release mechanisms are attached to the seat back to releasably secure the seat back between the seating position and the second position, the third position and the fourth position, and the seat back is biased into the second, third and fourth positions by the second, third and fourth springs when the seat back is disengaged from the second, third and fourth release mechanisms.

9. A seat assembly comprising a seat back including:

a main frame;

a lower frame pivotable relative to said main frame about a first horizontal axis; and an upper frame pivotable relative to said lower frame about a second horizontal axis;

wherein said seat back includes a rear side and is movable between:

a seating position, wherein said rear side is in a generally vertical position;

a second position, wherein said seat back pivots about said first horizontal axis and said rear side is in a first generally horizontal position; and a third position, wherein said seat back pivots about said second horizontal axis and said rear side is in a second generally horizontal position which is positioned higher than the first generally horizontal position; and a seat bottom movable independent of said seat back, said seat bottom being movable between a seating position, wherein said seat bottom is in a generally horizontal position for supporting an occupant seated on said seat assembly, and a forward position, wherein said seat bottom is in a generally vertical position such that a rear edge of said seat bottom is positioned above a front edge of said seat bottom.

10. The seat assembly of claim 9, wherein said seat bottom must be moved to said forward position to accommodate said seat back when said seat back is moved to said second position.

11. The seat assembly of claim 9, wherein said seat back is positioned on top of said seat bottom when said seat bottom is in said seating position and said seat back is in said third position.

12. The seat assembly of claim 2, wherein said seat bottom defines a lower cross member pivotally mounted in a cantilevered manner to a pivot member adapted to be attached to the floor of the vehicle.

13. The seat assembly of claim 9, wherein said seat bottom defines a lower cross member pivotally mounted in a cantilevered manner to a pivot member adapted to be attached to the floor of the vehicle.

14. A seat assembly for a vehicle having a rear seat positioned behind said seat assembly, said seat assembly comprising:

a seat bottom movable between a seating position, wherein said seat bottom is in a generally horizontal position for supporting an occupant seated on said seat assembly, and a forward position, wherein said seat bottom is in a generally vertical position such that a rear edge of said seat bottom is positioned above a front edge of said seat bottom;

a seat back movable between a seating position, wherein said seat back is in a generally lateral position relative to the vehicle for supporting an occupant seated on said seat assembly, a second position, wherein said seat back extends longitudinally relative to the vehicle to permit access to a rear seat positioned behind said seat assembly, and a third position, wherein said seat back is in a generally horizontal position such that a rear side of said seat back faces upward; and a spring mechanism biasing said seat back to said third position.

15. The seat assembly of claim 14, wherein said seat back has an inboard side and an outboard side, and wherein said seat back is pivotable about a generally vertical axis adjacent said inboard side to move said seat between said seating and second positions.

16. The seat assembly of claim 14, wherein said seat bottom and said seat back are movable independent of each other.

17. The seat assembly of claim 14 further including a second spring mechanism biasing said seat bottom to said forward position.

18. The seat assembly of claim 14, wherein said seat back is pivotable about a first horizontal axis to move said seat back to said third position, and wherein said seat back is also pivotable about a second horizontal axis to move said seat back to a fourth position such that said rear side of said seat back faces upward and is positioned higher than when said seat back is in said third position.

19. The seat assembly of claim 18 wherein the seat back further comprises a main frame;

a lower frame pivotable relative to said main frame about the first horizontal axis; and an upper frame pivotable relative to said lower frame about the second horizontal axis.

20. The seat assembly of claim 18 further comprising a first release mechanism and a first spring wherein the first release mechanism releasably secures the seat bottom to the seating position, and the first spring biases the seat bottom into the forward position when the seat bottom is disengaged from the release mechanism; and a second, third and fourth release mechanism and a second, third and fourth spring, wherein the second, third and fourth release mechanisms are attached to the seat back to releasably secure the seat back between the seating position and the second position, the third position and the fourth position, and the seat back is biased into the second, third and fourth positions by the second, third and fourth springs when the seat back is disengaged from the second, third and fourth release mechanisms.

* * * * *